| United States Patent [19] | [11] Patent Number: 4,492,636 |
|---|---|
| Burke | [45] Date of Patent: Jan. 8, 1985 |

[54] PROCESS FOR CLEANING METAL WORKING FLUIDS FOR RE-USE

[75] Inventor: John M. Burke, Kirtland, Ohio

[73] Assignee: Eaton Corporation, Cleveland, Ohio

[21] Appl. No.: 572,341

[22] Filed: Jan. 20, 1984

Related U.S. Application Data

[63] Continuation-in-part of Ser. No. 465,708, Feb. 11, 1983, abandoned, which is a continuation-in-part of Ser. No. 363,190, Mar. 29, 1982, abandoned, which is a continuation-in-part of Ser. No. 172,626, Jul. 28, 1980, abandoned.

[51] Int. Cl.³ ............................................. B03D 1/02
[52] U.S. Cl. ..................................... 210/706; 210/705; 210/712; 252/49.5
[58] Field of Search .................................. 210/703–708, 210/712, 718, 725, 727, 728, 734, 735, 221.1, 221.2; 252/49.5

[56] References Cited

U.S. PATENT DOCUMENTS

| 2,578,040 | 12/1951 | Booth et al. | 210/703 |
|---|---|---|---|
| 3,446,488 | 5/1969 | Mail et al. | 210/705 |
| 3,707,464 | 12/1972 | Burns et al. | 210/705 |
| 3,948,784 | 4/1976 | Krillic et al. | 252/49.5 |

OTHER PUBLICATIONS

Bulletin No. KSB 123-8106 by Komline-Sanderson Company.

*Primary Examiner*—Peter Hruskoci
*Attorney, Agent, or Firm*—C. H. Grace; A. E. Chrow

[57] ABSTRACT

Disclosed is a process for removing foreign matter and tramp oil from a continuously recirculating metal working fluid. The process includes the use of saturated dissolved air flotation which, contrary to prior belief, is able to effectively remove the foreign matter and tramp oil in a quiescent manner with little or no foaming and without removing or harming any emulsions present in the metal working fluid. The process further includes the use of water soluble organic cationic and anionic polyelectrolytes where desired to flocculate the foreign matter and tramp oil to enhance their removal from the metal working fluid and a process by which the formation of foam at or near the surface of the metal working fluid being clarified is able to be suppressed.

6 Claims, 1 Drawing Figure

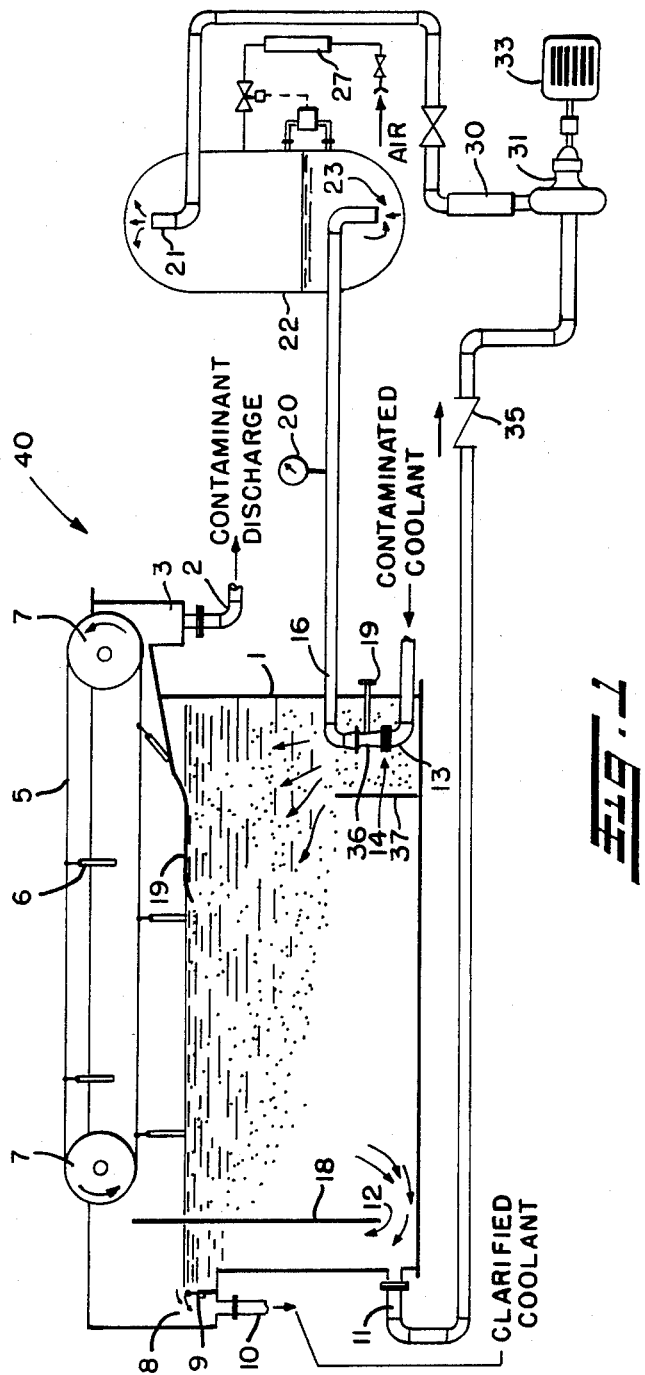

PROCESS FOR CLEANING METAL WORKING FLUIDS FOR RE-USE

This is a continuation-in-part of application Ser. No. 465,708, filed Feb. 11, 1983, now abandoned, which is a continuation-in-part of application Ser. No. 363,190 filed Mar. 29, 1982, now abandoned, which is a continuation-in-part of application Ser. No. 172,626 filed Jul. 28, 1980 now abandoned.

INTRODUCTION

This invention relates generally to a process for removing suspended foreign matter from metal working fluids for re-use and more particularly to a continuous recycling process for removing suspended foreign matter and contaminant oil from metal working fluids with little or no foaming and without removing or otherwise adversely affecting emulsions present in the fluids and which enables immediate re-use of the metal working fluid by means of a saturated dissolved air solution flotation process preferably in conjunction with the addition of water soluble organic cationic and anionic polyelectrolytes.

BACKGROUND OF THE INVENTION

Metal working fluids are commonly used for purposes of cooling and/or lubricating and/or cleaning metal during metal working processes such as cutting, grinding, forming, rolling, and the like. Fluids available from commercial sources for such purposes generally include oil-in-water emulsions and non-petroleum water soluble (synthetic) compositions and synthetic emulsions or combinations thereof. Emulsified oil type metal working fluids typically comprise about 1–10% by weight of oil in combination with a small amount of an emulsifier, such as hydrogenated animal fat, sodium sulfonate complexes and the like, and about 90% or more by weight of water. Synthetic metal working fluids on the other hand typically comprise mixtures of a water miscible organic polyamine such as mono, di, and triethanolamines in combination with borates and suitable wetting agents. As used herein, unless otherwise specifically referenced, the term "metal working fluid" includes emulsified oil, synthetic composition, and synthetic emulsion type fluids and blends thereof.

Depending upon the particular metal working process, the metal working fluids characteristically become contaminated over a period of time with foreign matter such as ferrous or non-ferrous metal ions, dirt, bacteria, tramp oil, and other foreign particles. Tramp oil is a general term describing, hydraulic, lubricating and cutting oils used in various machining processes that by reason of leaks, drippings and the like enter into and contaminate the metal working fluid. The presence of tramp oil in metal working fluids has been found to be detrimental to the metal working process in that it enhances bacterial growth, smoking, and contributes to heat build up which ultimately lessens tooling life.

Although it has been common practice in the past to continuously recycle metal working fluids during the metal working process and to utilize various means to remove such contaminants in an attempt to prolong the useful life of the fluids and improve the life of tooling used in conjunction therewith, such systems have not been altogether satisfactory. Up until the time of the present invention, the principal methods of clarifying metal working fluids have been by singular or combined use of settling tanks, filters centrifuges and froth floation. Each, however, has proven to be unsatisfactory under actual manufacturing conditions which often require clarification of large volumes of contaminated fluid that are continuously recycling. Although useful for some purposes, settling tanks are generally unable to remove smaller particles that have a specific mass the same as or lighter than the fluid itself and are often too slow and/or to large to keep up with manufacturing requirements. Filters have been found to be unsatisfactory due to clogging by the contaminants in addition to expensive maintenance requirements and centrifuges have been found to be too costly due to high initial expense in addition to costly maintenance requirements.

Froth flotation has been used for many years to clarify waste water and fluid mediums other than metal working fluids. Examples of United States patents covering froth flotation of fluid mediums other than metal working fluids include: U.S. Pat. Nos. 2,153,449 (clarifying viscose rayon); 2,335,209 (removing paper pulp from white water); 2,347,147 (treatment of paper mill waste water); 2,352,365 (removal of oils and fats from emulsions); and 2,274,658 (removing gases from rayon spinning both), the disclosures of all of which are included herein by reference. In all of the above, Fagergren type mixers of the type disclosed in U.S. Pat. Nos. 1,963,122 or 2,101,331 are recommended which, while rotating at relatively high speed, are able to induce air into the fluid to produce froth which floats to the top of the fluid. However, unlike metal working fluid, little concern is given to the amount of froth produced or the loss due to the frothing of the fluid medium itself.

Froth flotation is proported to be useful in clarifying metal working fluids in U.S. Pat. No. 2,578,040, the disclosure of which is incorporated herein by reference. Such, however, has been found not to be the case, particularly in clarifying emulsion type metal working fluids for, like the other fluid mediums described above, the vigorous mixing and induction of air into the metal working fluid has been found to result in a substantial loss of emulsion forming at least part of the froth which is subsequently removed by skimming or other suitable means. In addition to being unsuitable for clarifying metal working fluids in a swift and economical manner, Froth flotation is also extremely sensitive to the hardness and variations in the hardness of the fluid being clarified which, dependent upon the hardness, necessarily produces varying amounts of froth which in turn results in the problem of having to continuously change the penetration depth of the skimmer or condition of the other means being used to remove froth as well as resulting in substantial increases in the amount of froth for mediums having a low hardness level.

Pumping (inducing) air directly into contaminated waste water without the vigorous mixing and turbulence of froth flotation has also been found to be unsatisfactory in clarifying contaminated metal working fluids for, like froth flotation, the amount of froth produced is unsuitable due to the loss of expensive metal working fluid sustained in removing the froth.

Like waste water treatment, various chemicals may be added to contaminated metal working fluids to enhance the removal of the contaminants and/or maintain desirable properties associated with the fluid.

Examples of methods for providing metal working fluids that utilize a water soluble form of a tertiary amine in order to apply a corrosion resistant film to the metal being formed or a sequestering agent for prolonging the life of the fluid are disclosed respectively in U.S. Pat. Nos. 2,917,160 and 3,365,397, the disclosures of which are incorporated herein by reference.

Other examples of methods for inhibiting the growth of bacteria with certain chemical additions and clarifying metal working oils by use of a trimerized polycarboxylic acid are disclosed respectively in U.S. Pat. Nos. 3,240,701 and 3,450,627 the disclosures of which are incorporated herein by reference. Specific methods for separating foreign matter from metal working fluids are disclosed respectively in U.S. Pat. Nos. 3,408,843; 3,618,707; 3,750,847; and 4,033,866, the disclosures of which are incorporated herein by reference.

An example of a method utilizing cationic electrolytes for treating aqueous solutions of synthetic water soluble lubricants containing suspended particles can be found in U.S. Pat. No. 3,928,784, the disclosure of which is incorporated herein by reference. The method disclosed is essentially a batch process in that it requires that the suspension stand for at least two minutes to allow flocculation and settling of the particles prior to their removal.

Other examples of specialized chemical compositions and methods for removing suspended foreign particles from metal working fluids are disclosed in U.S. Pat. Nos. 3,563,895; 3,634,243; and 4,146,488, but, as in the case of the methods previously described, none, prior to the present invention, has ever been used in conjunction with a process for removing contaminant oil and foreign matter from metal working fluids with little or no foaming in a continuous recycling process that is able to operate over long periods of time without the need for costly shutdown and maintenance problems heretofore described.

Like induced air and froth flotation, saturated dissolved air flotation, has been used to advantage in the past in clarifying waste water prior to its discharge into a stream, pond or lake. An example of the use of saturated dissolved air in combination with a vacuum to remove fibers from a water mixture is disclosed in U.S. Pat. No. 1,717,223 and the use of saturated dissolved air in conjunction with an agitator for clarifying waste water is disclosed in U.S. Pat. No. 2,248,177, the disclosures both of which are included herein by reference. However, it was not thought prior to the present invention that saturated dissolved air flotation would be a suitable method for removing contaminants in a continuous recycling process from metal working fluids, particularly oil emulsion type metal working fluids, for fear that the saturated dissolved air would promote foaming and would remove or otherwise adversely affect the emulsion. An example showing that dissolved air will remove emulsions from waste water is disclosed on page 40 in an article entitled "Air Flotation Treatment of Refinery Waste Water" by J. L. Steiner et al published in Chemical Engineering Practice in December of 1978. An example of the fact that up until the time of the present invention those ordinarily skilled in the art of metal working fluids did not appreciate or apperceive that saturated dissolved air flotation could be effectively used to clarify metal working fluids without detriment to the fluid is evidenced by the conspicuous absence of any reference thereto in an article entitled "Lubricant Conditioning and Disposal" in Chapter 30 of the "Standard Handbook of Lubrication Engineers" published by McGraw-Hill Inc. and copyrighted in 1968.

Up until the time of the present invention, manufacturers of saturated dissolved air equipment were specifying saturated dissolved air equipment that could only be used to advantage in removing contaminants from waste water with no suggestion that it could be useful in removing foreign matter from metal working fluids in a continuous recycling process in which the fluid could be continuously re-used rather than discarding it as waste sufficiently clarified to meet environmental standards. Typical examples of such teaching is disclosed in a publication by Cincinnati Milicron Company numbered PC 658 entitled "Central Filteration Systems for Cutting and Grinding Fluids" and in a publication by Komline-Sanderson Company covering a sales meeting of 1978 entitled "Dissolved Air Flotation Program".

In contrast to the various methods described above, it has been found that the process of the present invention substantially increases the life of the tooling being utilized in the particular metal working operation as well as eliminating the need to use additional filters commonly utilized for the removal of foreign matter suspended in the metal working fluid where desired. In addition, the process of the present invention by the effective removal of tramp oil has been found to provide a marked reduction or elimination of misting of the fluids commonly associated with prior art metal working fluid recycling processes so as to substantially reduce the potential of dermatitus, the inhalation of oil mist, and fire hazards commonly associated with such processes as well as causing the effective rapid removal of foreign matter and contaminant oil from metal working fluids, particularly oil emulsion type fluids, with little or no foaming and without the need for prior chemical treatment to break up the emulsion.

SUMMARY OF THE INVENTION

It is accordingly a provision of the present invention to provide a simple and rapid process for continuously removing suspended foreign matter and contaminant oil from metal working fluids enabling the virtual immediate re-use of the fluid without the requirement of vigorous mixing.

It is another provision of the present invention to provide a recycling process for continuously removing suspended foreign matter from metal working fluids that provides a means of agglomerating the suspended foreign matter in a highly efficient manner in conjunction with a simple, rapid, and highly effective means of removing the agglomerated foreign matter and contaminant oil from the metal working fluid during the recycling process that is able to operate over long periods of time without costly shutdown or maintenance requirements or loss of emulsion(s) present in the metal working fluid.

It is yet another provision of the present invention to provide a rapid and highly effective method for removing suspended foreign matter from metal working fluids by means of a continuous recycling process which utilizes the addition of effective agglomerating amounts of water soluble organic cationic polyelectrolytes or combinations of such cationic polyelectrolytes with anionic polyelectrolytes to enhance the agglomeration of the foreign matter in conjunction with the use of saturated dissolved air flotation as a means of rapidly removing the agglomerated particles in a quiescent manner with little or no foaming so as to greatly extend the working life of the metal working fluid over long periods of time without costly shutdown and maintenance requirements as well as to improve the useful life of tooling used in conjunction with such fluids while minimizing misting commonly associated with the recycling of such fluids.

It is still another provision of the present invention to provide a method for removing foreign contaminants from metal working fluids in a continuous recycling process that is able to suppress foaming and which subjects the fluid to saturated dissolved air in a quiescent manner without removing or otherwise destroying any desirable emulsions contained within the fluid.

It is yet another provision of the present invention to provide a continuous recycling process that utilizes saturated dissolved air flotation in a quiescent manner to effectively remove foreign contaminants and tramp oil from metal working fluids without removing or otherwise destroying desirable emulsions that may be contained within the fluid.

BRIEF DESCRIPTION OF THE DRAWING

FIG. 1 shows a side elevation view of an embodiment of a tank and pressure vessel arrangement suitable for practicing the process of the invention.

DESCRIPTION OF PREFERRED EMBODIMENTS

Systems for recycling metal working fluids generally involve collecting the contaminated fluids at the site of the particular metal working operation and transporting the fluid by suitable means, such as by gravity flow or pumping through pipes, ducts, troughs, and the like, to one or more cleaning stations commonly comprising tanks or chambers of some kind where operations are conducted for removal of the foreign matter and then returning the cleaned fluid by suitable means back to the metal working operation. As previously described, such recycling systems commonly use screens, settling tanks, mechanical filters or centrifuges to separate foreign material from the metal working fluid and in some instances, where ferrous metals are involved, may use magnetic means for removing ferric particles.

Although the method of the present invention generally eliminates the need for devices such as mechanical filters, screens, centrifuges, magnets, and the like, the method of the present invention may include the use of such devices, if such is desired, and further includes the previously described pumps, pipes, ducts, tanks and troughs commonly associated with metal working fluid recycling systems.

It has been found that in the use of synthetic metal working fluids, such as sold by Master Chemical Corporation under the trade name Trim 9106 CS, that the addition of an effective agglomerating amount of a water soluble organic cationic polyelectrolyte floccuating agent, such as sold by Dow Chemical Company under the trade name Purifloc C 31, will agglomerate the foreign matter so as to facilitate its removal from the metal working fluid. Purifloc C 31 is a water soluble organic cationic polyelectrolyte believed to be a polyacrylamide and 9106 CS is believed to be a mixture of a water solution of an organic polyamine with a borate and wetting agent. It has also been found that the addition of an effective agglomerating amount of an anionic polyelectrolyte, such as sold by Mogul Corporation under the trade name Mogul 9044A will enhance the agglomeration initiated by the addition of the cationic polyelectrolyte and place the agglomerated foreign matter in a superior position for removal from the metal working fluid. Mogul 9044A is a water soluble high molecular weight organic anionic polyelectrolyte.

A typical effective agglomerating amount of Purifloc C31 cationic polyelectrolyte has been found to be about 10–50 mg. per liter of the metal working fluid. The actual amount used in a particular situation can be determined experimentally by increasing the amount added to the point where agglomeration of the foreign matter appears to have maximized under the particular circumstances involved.

A typical effective agglomerating amount of the Mogul 9044A anionic polyelectrolyte has been found to be about 0.5–1.0 mg. per liter of the metal working fluid containing the cationic polyelectrolyte flocculating agent. As in the case of the cationic polyelectrolyte, increasing amounts of the anionic polyelectrolyte can be experimentally added so as to determine the optimum level of agglomeration enhancement for a particular situation. Thus the process of the invention contemplates the addition of both a water soluble organic cationic polyelectrolyte and a water soluble organic anionic polyelectrolyte to metal working fluids containing suspended foreign matter with the former initiating agglomeration of the foreign matter and the latter enhancing the agglomeration so as to provide for effective removal of the foreign matter from the metal working fluid.

It has also been found that in the use of metal working fluids containing tramp oil that the use of an effective agglomerating amount of a cationic polyelectrolyte such as sold by Mogul Corporation under the trade name Mogul 9047C in conjunction with the saturated dissolved air flotation process hereinafter described is able to effectively remove the tramp oil from the metal working fluid. Mogul 9047C is a water soluble high molecular weight organic cationic polyelectrolyte. Although experimentation may be undertaken as previously described to determine the optimum amount of cationic polyelectrolyte to add to the emulsified oil metal working fluid, it has been found that between 1 mg. and 10 mg. of the cationic polyelectrolyte per liter of the metal working fluid is highly effective.

As previously described, the cationic and anionic polyelectrolytes used in the invention can be dissolved in water and thus may either be mixed in water prior to addition to the metal working fluid or be directly added so as to be dissolved by the water commonly contained in both oil emulsion and synthetic type metal working fluids. The previously described typical weight additions refer to the weight of the cationic and anionic polyelectrolyte prior to its having been dissolved in water.

The cationic and anionic polyelectrolytes may be added by any suitable means that results in their uniform dispersal in the metal working fluid. A convenient and effective method for addition has been found to be by metering water solutions of the cationic and anionic polyelectrolytes preferable by gravity feed into the bore of a pipe or directly into an open tank through which the contaminated metal working fluid is flowing.

Although the use of a combination of cationic and anionic polyelectrolytes is known to have been used for agglomeration purposes in the past in waste water treatment processes in which the clarified waste water was scheduled to be discarded into a stream, pond or like, it was not known until the time of the present invention whether such combination would be deleterious to metal working fluids which must be continuously re-used over and over again. In contrast to waste water treatment, it was not known until the time of the present invention whether controlled amounts of combined cationic and anionic polyelectrolytes could be added to effectively enhance the agglomeration of the foreign matter without harming the lubricating, cooling and other desirable properties normally associated with metal working fluids or cause any emulsified portions thereof to de-emulsify and thereby destroy the effectiveness of the fluid. It has been found however that effective agglomerating amounts of the combination of water soluble organic cationic and anionic polyelectrolytes can be added to metal working fluids without adversely affecting the desired properties of the fluids and without promoting additional undesired properties. It has been further found that metal working fluids from which suspended foreign matter has been removed by the process of the present invention is able to be used effectively over long periods of time without loss of the desired properties of such fluids.

It has also been found that agglomerated foreign matter provided by the addition of cationic polyelectrolytes to a metal working fluid and enhanced agglomerated foreign matter provided by the addition of cationic and anionic polyelectrolytes to a metal working fluid can be rapidly removed in an effective manner without removing foam with the aid of the saturated dissolved air flotation process of the present invention. It has been further found that saturated dissolved air is able to rapidly remove agglomerated foreign matter whether such matter remains suspended or tends to settle in the metal working fluid. Although heretofore known to be used in the removal of foreign matter from waste water treatment, it was thought, up until the time of the present invention, that such process would be detrimental to a metal working fluid. Contrary to such opinion, the saturated dissolved air flotation process of the present invention has been found to work well in rapidly removing suspended foreign matter from metal working fluids without deleterious effect.

As previously described, saturated dissolved air flotation is not to be confused with induced air flotation. Induced air flotation features the introduction of nucleated air bubbles into the contaminated metal working fluid either directly or in conjunction with mechanical stirring or nozzles such as disclosed in previously described U.S. Pat. No. 2,578,040. Saturated dissolved air flotation employs the process of dissolving air in contaminated and/or uncontaminated metal working fluid under a pressure of preferably from about 40 to about 70 psi to provide a pressurized saturated dissolved air solution and then mixing this solution quiescently with the contaminated metal working fluid in the lower portion of a tank containing the contaminated metal working fluid before the air within the solution is able to nucleate and form bubbles. Although higher pressure may be used, such may prove to be unwarranted due to the cost of the high pressure equipment required. Whereas induced air bubbles characteristically rise rapidly upwardly through the contaminated metal working fluid while impinging upon and carrying the contaminants and any emulsions present towards the upper surface of the fluid in addition to promoting foaming at the upper surface thereof, it has been discovered that lessening of the pressure upon a saturated dissolved air solution within a tank or chamber containing contaminated metal working fluid will cause the dissolved air to spontaneously nucleate upon all wall surfaces and in regions of turbulence and on suspended contaminants but not emulsions that are exposed to the saturated dissolved solution to form small bubbles which adhere to the contaminants but not emulsion present in the contaminated metal working fluid and carry the contaminants but not the emulsion upwardly towards the surface of the contaminated metal working fluid with little or no foaming. Whereas a saturated dissolved air and water solution is expected to and will characteristically strip emulsions from waste water, it was totally unexpected for a saturated dissolved air solution of a contaminated or uncontaminated metal working fluid solution not to strip emulsion from contaminated metal working fluid. The tank or chamber is adapted to enable the continuous flow of the metal working fluid therethrough and to enable the saturated dissolved air solution to mix thoroughly with the metal working fluid in the lower portion thereof before the air within the solution is able to nucleate and expand into a multitude of bubbles that are able to rise through the metal working fluid towards the upper surface thereof within the tank or chamber.

It has been found that the pressurized saturated dissolved air solution process of the present invention provides a smaller and more uniform bubble size versus the induced air method and that such uniformity and size greatly aids in the removal of suspended foreign matter from the working fluid and is able, with little or no foaming, to form a concentrated layer of the contaminates in the upper level of the that can easily be removed. For example, whereas the bubble diameters associated with induced air typically range from 100 to 1000 microns, the diameter of bubbles provided by the pressurized saturated dissolved air solution previously described is generally less than 60 microns. Although it is preferred to make the saturated dissolved air solution from an uncontaminated portion of the metal working fluid being cleaned, it is to be understood that such solution can be made with the contaminated metal working fluid or with water or other fluid so long as the water or other fluid is compatable with the metal working fluid and does not interfere with the quality and concentrations of materials making up such fluids. Typically, the saturated dissolved air solution is obtained by first portioning off some of the uncontaminated metal working fluid to a pressure vessel at some suitable location in the recycling process, and then introducing pressurized air into the uncontaminated metal working fluid in the pressure vessel until it becomes saturated and then conveying the resultant saturated dissolved air solution under pressure into the lower portion of a tank containing the contaminated metal working fluid as previously described. Typically, after about ½ second, the bubbles spontaneously nucleate to adhere upon and carry the agglomerated foreign matter upwardly as previously described so as to concentrate the foreign matter at the upper level of the tank with little or no foaming where suitable means, such as a skimmer, can be employed to suppress foaming while removing the contaminates by a technique hereinafter described.

A key advantage to the process of the invention is that the process does not rely on any foaming or frothing techniques so that the penetration depth of the skimmer or condition of the means to remove the contaminates can be left unattended for long periods of time due to the repeatability of height of the contaminant layer at the top of the fluid whereas clarification systems utilizing agitation produce amounts of froth that varies substantially with the hardness of the metal working fluid requiring constant adjustment to the skimmer depth or other means employed to remove the contaminants.

As previously described, processes involving the use of induced air for clarifying metal working fluids have been found to result in substantial frothing or foaming at or near the upper surface of the contaminated metal working fluid which in turn results in the destruction and/or loss of metal working fluid including the destruction or loss of any desirable emulsions present in the metal working fluid during the process of removing the contaminants from the surface of the metal working fluid. An example of such loss is described in the middle of column 7 and in example 12 of U.S. Pat. No. 2,578,040. The problem of frothing or foaming is not aided by devices such as disclosed in U.S. Pat. No. 3,446,488 which provides a device for lessening pressure upon the saturated dissolved air solution so that bubbles are formed within the dissolved air solution before the solution is mixed with the contaminated metal working fluid resulting in air bubbles which are in the free state and which rise rapidly to promote foaming at the upper surface of the metal working fluid.

Illustrative of the fact the introduction of air bubbles already formed into the lower portion of a chamber containing a contaminated metal working fluid desired to be clarified is ineffective is exemplified by my own laboratory work in which I inadvertantly connected the lower portion of a tank containing the contaminated metal working fluid to an outlet valve of a tank containing a dissolved air solution of uncontaminated metal working fluid under pressure of about 70 psig by means of a rubber hose which, when the valve was opened, expanded sufficiently to lower the pressure on the saturated dissolved air solution sufficiently to enable air bubbles to form within the saturated dissolved air solution before the solution was able to mix with the contaminated metal working fluid with the result that the bubbles, which were already formed before entering the contaminated metal working fluid, rose rapidly upwardly through the metal working fluid to promote foaming at the upper surface thereof and were totally ineffective in removing suspended contaminants from the contaminated metal working fluid.

As previously described, it is essential that the pressure be sustained upon the saturated dissolved air solution sufficient to ensure that the air remains dissolved in the solution and does not form into bubbles until after the saturated solution is released within the contaminated metal working fluid to be clarified. Preferably the pressurized saturated dissolved air solution is introduced into a lower portion of the tank close to the point at which the contaminated metal working fluid enters and in such a manner that the two are able to mix thoroughly in a quiescent manner, before the air within the solution is able to expand into bubbles.

An example of equipment found particularly suitable for clarifying metal working fluids is sold by Komline-Sanderson Company of Peapack, N.J. of which suitable tanks are illustrated on page 4 in their Bulletin No. KSB 123-8106. The Komline-Sanderson equipment is sold for use in clarifying waste water and from my own experience is designed for and will remove contaminants and emulsions from waste water but surprisingly will not result in the destruction and/or removal of emulsions contained within metal working fluids. Although round or other shaped tanks may be used, rectangular shaped tanks are preferred for containing the contaminated metal working fluid. The Komline-Sanderson tank referred to above is shown in FIG. 1 as Tank 1 and is generally rectangular in shape and is provided with an inlet 13 for the contaminated metal working fluid in the lower region at one end and an outlet 12 in the lower region at the opposite end so that metal working fluid is required to flow across the length of the tank towards the exit location. Tank 1 is provided with a weir plate 18 near the outlet which the metal working fluid must pass under before it is able to exit. After passing through exit 12, the clarified coolant rises and passes over an adjustable liquid level baffle 9 and into a collecting trough 8 and an exits tank 1 through discharge pipe 10. The tank is also provided with an adjustable conveyor type skimming device 5 driven by rotating drums 7 well known to those skilled in the art whose blades 6 can be adjusted to skim contaminants from the top of the metal working fluid to a beach 19 communicating with an outlet 3 for the contaminants which communicates with contaminate discharge pipe 2. The direction of skimming is preferably in a direction opposite to the flow of the metal working fluid through tank 1 such that beach 19 for collecting the contaminants is located at the same end and above the location at which the contaminated metal working fluid enters tank 1. The inlet 36 for the saturated dissolved air solution is located adjacent and above the inlet 13 for the contaminated metal working fluid and is directed so that the saturated dissolved air solution intersects the path of the metal working fluid entering tank 1 so as to cause the two to mix thoroughly as soon as they both enter tank 1 before the air within the saturated dissolved air solution is able to form bubbles as previously described. As hereinafter described, outlet 36 is preferably a diaphragm type valve which preferably can be adjusted by a handle 15 or the like from the exterior of tank 1. It has been found that, for flow rates of about 25 gallons per minute and when the saturated dissolved air solution is under about 70 psig as shown on gauge 20 as it passes through pipe 16 upon entrance into tank 1, at least about ½ second of mixing time is required in order to be thoroughly mixed before air bubbles within the saturated dissolved air solution begin to form. In order to ensure adequate mixing, tank 1 is provided with a mixing zone 14 adjacent the inlets preferably by means of a baffle plate 37 which provides a quiescent zone in which the incoming contaminated metal working fluid and saturated dissolved air solution first meet and which communicates with the main chamber of tank 1 in such a manner as to enable the mixture to flow into the main chamber toward outlet 12 previously described. The main chamber may also include a conveyor type scraping apparatus at the bottom for scraping any matter toward a suitable outlet from tank 1 for same has settled during shutdown of the equipment.

As shown in FIG. 1, the formation of the contaminated or uncontaminated saturated dissolved air solution is conducted in a suitably sized pressure vessel 22 preferably located separate from flotation tank 1. Various methods may be employed to provide the saturated dissolved air solution as is well known to those ordinarily skilled in the art of waste water treatment. A preferred method is to provide a suitably valved inlet 21 near the top of vessel 22 that by means of a suitable float control 24 is able to maintain a desired level of the metal working fluid within vessel 22 and by means of pipe 21 rising vertically within vessel 22 to enable the metal working fluid to be sprayed into the space above the upper surface of the metal working fluid and mix with air that is conveyed into vessel 22 through flow meter 27 under sufficient pressure to penetrate and saturate the metal working fluid. While the saturated dissolved air solution exits vessel 22 through outlet 23 of pipe 16, the clarified metal working fluid preferably exits tank 1 through exit 11 and is conveyed through check valve 35 and is pumped by means of pump 31 driven by a suitable motor 35 through flow meter 30 into previously described pipe 21. Typically, about 2 minutes of residence time for the metal working fluid within above described pressure vessel 22 at 70 psig air pressure is required to provide the saturated dissolved air solution.

Although the use of saturated dissolved air solution for clarifying contaminated metal working fluids has been found to result in little or no foaming at or near the upper surface of the contaminated metal working fluid as previously described, it has been discovered that even such minimal foaming, if present, can be suppressed by continually removing only an upper portion of the concentrated layer of contaminates at the upper surface of the contaminated metal working fluid so that the upper surface of the contaminated metal working fluid is continually blanketed with the remaining portion in an amount sufficient to suppress foaming. The process of the invention preferably includes the practice of removing only an upper portion of the contaminate layer concentrated at or near the upper surface of the contaminated metal working fluid being clarified by saturated dissolved air flotation. The amount of the upper portion of the concentrated contaminant layer to be removed in order to leave enough to suppress foaming can be accomplished, for example, by adjusting the depth at which the blades of a skimming device penetrate the concentrated contaminant layer and the speed at which the blades traverse across the contaminant layer.

In order to control the flow of the saturated dissolved air solution into Tank 1, outlet 36 of the pipe conveying the solution into the mixing chamber is provided with a valve that can be controlled by suitable means from a location outside of the tank. It has been found that the type of valve used is important in preventing the formation of air bubbles within the solution before it is able to mix thoroughly with the incoming mixed working fluid. Generally, an air actuated elastomeric diaphragm type valve is preferred over gate, ball, plug or similar type valves since such valves are characteristically prone to produce shear and/or cavitation effects that cause a sufficient reduction in pressure to cause bubbles to form within the solution before the solution is able to mix thoroughly with the contaminated metal working fluid.

Contrary to the teaching in the prior-art that saturated dissolved air flotation will remove or otherwise adversely affect emulsions present in waste water, it has been surprisingly found that, in addition to the use of saturated dissolved air flotation in conjunction with cationic and anionic polyelectrolytes as previously described, saturated dissolved air flotation alone is able to rapidly remove floating, suspended and settling foreign matter from metal working fluids in a continuous recycling process with little or no foaming and without removing or otherwise adversely affecting emulsions, particularly oil-water emulsions, present in the fluid and that such removal does not, as taught in the prior art, require chemical treatment of the fluid to break up the emulsion prior to its use in order to be effective. Thus in addition to the use of saturated dissolved air flotation in conjunction with water soluble organic cationic and anionic polyelectrolytes, the present invention additionally provides for the use of dissolved air flotation in a continuous recycling process for the removal of foreign matter from metal working fluids containing emulsions that heretofore were thought would be removed or otherwise destroyed by such process.

It has been further found that, contrary to fears concerning the inability to remove semi-emulsified tramp oil from the fluid mechanically, saturated dissolved air flotation can effectively remove tramp oil and floating and suspended and settling foreign contaminants from metal working fluids with little or no foaming and without removing or otherwise adversely affecting emulsions present in the fluid without the need for chemical treatment to break up any tramp oil emulsion that may be formed by locating the saturated dissolved air flotation unit in the process stream at a point at which it is able to remove the tramp oil before it is able to be totally emulsified by any emulsifying agents present in the fluid.

The location of the saturated dissolved air unit for removing tramp oil before it becomes emulsified is of course dependent upon the circumstances surrounding the particular installation. It has been found that saturated dissolved air flotation is able to effectively remove tramp oil from metal working fluids before it becomes totally emulsified by locating the dissolved air flotation unit in the process stream between the point at which it is known or there is reason to believe that tramp oil is entering into the fluid and the point at which the tramp oil becomes or is believed to be emulsified by any emulsifying agent present in the fluid.

Not only does agitation promote emulsification of tramp oil contained in metal working fluid rendering its removal virtually impossible as described in following Example IV, but it also promotes evaporation of water from the fluid which in turn increases the concentration of minerals such as calcium and magnesium ions resulting in increased hardness usually expressed in "grains" where one grain is defined as 17.1 mg/L per million of calcium carbonate per U.S. gallon of water. As is well known to those skilled in the art, increased mineral concentration is undesirable in that it can cause corrosion of machine tools and machine parts. Further, the increased hardness of the water portion of an agitated metal working fluid caused by evaporation results in a variable layer of froth or foam that would require constant changing of the removal techniques to minimize the amount of emulsion being removed from the metal working fluid. Thus, in contrast to the process of the present invention, froth flotation results in substantial loss of emulsion from the fluid, inability to remove emulsified tramp oil from the fluid, and excessive evaporation leading to hardness changes in the water content leading to increased corrosion and varying foam height requiring almost constant attention.

By way of the following examples, tests were conducted to illustrate: (1) that induced air flotation involving agitation such as disclosed in U.S. Pat. No. 2,578,040 promotes substantial froth and loss of emulsion and is essentially impractical due to variations in froth amounts arising from changing hardness of the metal working fluid; (2) that induced air flotation involving agitation such as disclosed in U.S. Pat. No. 2,578,040 will promote emulsification of tramp oil that is unable to be effectively removed; (3) that quiescent saturated dissolved air flotation will remove emulsions from waste water and; (4) that the saturated dissolved air process of the invention; (a) will remove little, if any, emulsions from emulsion type metal working fluid; (b) will effectively remove tramp oil from metal working fluid and; (c) has little sensitivity to variations in the hardness of the metal working fluid.

EXAMPLE I

An emulsion type metal working fluid was prepared by blending 50 Ml of ADSOL No. 2 to 1000 Ml of 8 grains hardness, Cleveland, Ohio tap water. ADSOL No. 2 is an emulsified machine oil sold under the ADSOL No. 2 Trademark by Ashland Petroleum Company.

500 Ml of the above blend was placed into an induced air froth generator and subjected to mixing at 2000 rpm for 20 seconds and then allowed to stand for 100 seconds upon which a froth height on top of the fluid of ¾ inch comprised essentially of the oil emulsion was measured. The results illustrate the loss of emulsion and large amount of froth associated with induced air flotation in conjunction with agitation.

EXAMPLE II

The hardness of the blend of Example I was adjusted to 24 grain hardness by adding 1 Ml of hard water concentrate sold by Master Chemical Corporation comprising a mixture of $CaCl_2$, $MgCl_2$ and $NaCl$ salts. The foam height after mixing and allowing to stand under the conditions described for Example I was measured at 1/16 inch. The test shows the marked effect that hardness has on the amount of froth produced and clearly illustrates the difficulty that would be encountered in establishing constant removal conditions for, should the metal working fluid become softer, substantial emulsions could be lost due to skimming away the large amount of froth produced and, as hardness levels build due to evaporation and make-up water, the foam height would be forever changing.

EXAMPLE III

In order to further illustrate the effect that hardness of the metal working fluid has on the amount of froth produced, 1.5625 Ml of the hard water concentrate of Example II was blended into 2500 Ml of distilled $H_2O$ along with 125 Ml of ADSOL No. 2 to provide an emulsion type metal working fluid having an effective 5 grain hardness. After mixing and allowing to stand in accordance with the procedures of Example I, a froth height at the top of the fluid of 1 1/16 inch was measured again illustrating the impractibility of clarifying emulsion type metal working fluids by utilizing induced air flotation in conjunction with agitation and the variability of foam or froth height as a function of the hardness of the water content of the metal working fluid.

EXAMPLE IV

To illustrate that induced air flotation in conjunction with agitation will not effectively remove tramp oil from emulsion type metal working fluids, 25 Ml of Mobil Medium hydraulic oil sold by Mobil Oil Company was added to 500 Ml of the blend of Example III. After mixing and allowing to settle in accordance with the procedures of Example I, a foam height of ¾" at the top of the fluid was measured and no tramp oil was found in the froth. The test clearly illustrates that induced air flotation with agitation, such as disclosed in U.S. Pat. No. 2,578,040, will strip emulsion from a metal working fluid containing an emulsion but will not remove tramp oil from the fluid and that foam height is decreased in the presence of tramp oil. Based on the results of Examples I, II, III and IV, trying to control foam height in an induced air flotation cell in the presence of normal evaporation rates and/or also in the presence of tramp oil would be virtually impossible.

The test also illustrates that excess available emulsifiers typically present in metal working fluid in the presence of tramp oil and sufficient agitation will cause the tramp oil to couple with the emulsifiers to rendering their removal virtually impossible by flotation techniques that involve agitation.

EXAMPLE V

To illustrate the surprising effect of clarifying an emulsion type metal working fluid quiescently with saturated dissolved air, 750 Ml of the metal working fluid of Example III was pressurized with air to 70 psi for 5 minutes in a pressure vessel measuring 12 inches high by 3.25 inch is in diameter. 2000 Ml of the same fluid was placed into a 2000 Ml beaker and 25 Ml of the weight Mobile Medium hydraulic oil was added by careful mixing to simulate tramp oil that is driven into emulsification without generating foam. Connected together by tubing, approximately 300 Ml of the same saturated dissolved air solution without tramp oil was transferred from the pressure vessel quiescently into the bottom of the beaker and allowed to stand for 100 seconds. The result was that a foam height of less than ⅛ inch but greater than 1/16 inch was measured at the top of the fluid. Analysis showed that the foam consisted essentially of the tramp oil entrapped with air bubbles while, below the tramp oil, the emulsion was not measurably foamed, which clearly illustrates that the process of the invention has the surprising ability to remove tramp oil but not emulsions from metal working fluids.

EXAMPLE VI

Lastly, the surprising result that saturated dissolved air quiescently added to waste water will strip emulsions from the water but not from metal working fluids containing emulsions is illustrated by preparing a typical sample of waste water by homogenizing 2000 Ml of Mobil DTE 26 into 2000 Ml of Cleveland, Ohio tap water at 6000 rpm for ten minutes and then adding a solution of 85 Ml of Cleveland, Ohio tap water and 5 Ml of emulsifier E by homogenation at 8000 rpm without generating foam. Mobil DTE 26 is a hydraulic oil with some emulsifying agents sold under the Trademark DTE 26 by Mobil Oil Company. Emulsifier E is an anionic soap sold by Coolant Control Incorporated under the Trademark Emulsifier E.

750 Ml of the above described waste water product containing emulsified oil was pressurized to 70 psi for 5 minutes to provide a saturated dissolved air solution in the pressure vessel described with respect to example V.

800 Ml of the waste water product was also placed into a 2000 Ml beaker and 350 Ml of the saturated dissolved air solution was transferred over a period of about 20 seconds from the pressure vessel into the bottom of the beaker as previously described with respect to Example V with less than ½ second of time involved in which the fluid went from the pressurized state to atmospheric pressure before contact was made with the waste water product in the beaker. A sample taken from the lower portion of the beaker after 5 minutes was analyzed and found to contain 53.11% less emulsified oil than was originally present in the waste water. The test clearly shows, as is well known to those skilled in the art of waste water treatment, that saturated dissolved air solution will remove emulsions from waste water but surprisingly, as shown under above Example V, will not remove emulsions from metal working fluids containing such emulsions.

It has been further found that saturated dissolved air flotation is so highly efficient in removing foreign contaminants and tramp oil from metal working fluids that in many cases it does not have to handle the entire flow at one time but can be installed in a by-pass line that is able to divert only a portion of the main flow through the dissolved air flotation unit and then return it to the main flow. As an example of the efficiency of dissolved air flotation, a Komline-Sanderson type flotation unit having a tank having only 15 square feet of flotation surface was installed in a bypass line to a main stream of the metal working fluid flowing at 1000 gpm and having a 600 square foot settling tank reservoir. The flotation unit was positioned in relation to the main stream so as to be able to remove tramp oil from the fluid prior to its becoming emulsified by any emulsifying agents present in the fluid. It was found that a flow rate of the metal working fluid of only 30-50 gpm through the flotation air unit was able to continuously effectively remove tramp oil and foreign matter and maintain the quality of the metal working fluid flowing in the main stream at 1000 gpm for extended periods of time with little or no foaming and without removing or otherwise adversely affecting emulsions present in the fluid.

What is claimed is:

1. In a continuous recycling process for removing suspended foreign matter including tramp oil from contaminated metal working fluid in an effective manner with little or no foaming and without removing or otherwise adversely affecting any oil or synthetic emulsions present in the fluid, said process comprising the steps of:
   (a) providing a tank through which the metal working fluid is able to continuously flow, said tank having a mixing zone within the lower region thereof in which the contaminated metal working fluid and a saturated dissolved air solution are able to mix quiescently prior to formation of air bubbles within the solution,
   (b) locating the tank in the process at a location that enables the tramp oil to enter the tank prior to the emulsification thereof by any emulsifying agents present in the fluid,
   (c) introducing the metal working fluid into the mixing zone of the tank of step (a),
   (d) dissolving air into a portion of the metal working fluid contained in a pressure vessel under sufficient pressure to provide a saturated dissolved air solution,
   (e) introducing the pressurized saturated dissolved air solution of step (d) into said mixing zone of the tank of step (c) in such a manner that the solution is able to mix quiescently with the contaminated metal working fluid before the formation of air bubbles within the solution begins to occur,
   (f) permitting the pressure on the saturated dissolved air solution to lessen within the tank so as to enable the air to spontaneously nucleate and expand into a multitude of bubbles that adhere to and carry the foreign matter and tramp oil but not the emulsion upwardly through the metal working fluid to form a concentrated layer of the foreign matter and tramp oil in the upper level of the metal working fluid, and
   (g) removing the concentrate of step (f) from the metal working fluid.

2. The process of claim 1 wherein the concentrate is removed in step (g) by skimming the concentrate from the metal working fluid.

3. The process of claim 1 wherein the tank is positioned so as to permit only a portion of the metal working fluid to flow therethrough.

4. The process of claim 1 including the step of adding an amount of water soluble organic cationic polyelectrolyte to the metal working fluid sufficient to effectively agglomerate the foreign matter and tramp oil prior to the entrance of the fluid into the tank.

5. The process of claim 1 including the step of adding an amount of water soluble organic anionic polyelectrolyte sufficient to enhance the formation of the agglomerate.

6. The process of claim 1 wherein only an upper portion of the concentrated layer of foreign matter is removed in step (g) in an amount enabling the remaining portion of concentrated foreign matter and tramp oil to blanket the metal working fluid sufficiently to suppress the formation of foam in the upper level of the metal working fluid.

* * * * *